(12) United States Patent
Pfeiffer

(10) Patent No.: US 6,791,208 B2
(45) Date of Patent: Sep. 14, 2004

(54) ELECTRICAL POWER CONTROLLER

(76) Inventor: Mark Pfeiffer, 11260 Amy Frances La., Alpharetta, GA (US) 30022

(*) Notice: Subject to any disclaimer, the term of this patent is extended or adjusted under 35 U.S.C. 154(b) by 111 days.

(21) Appl. No.: 10/329,779

(22) Filed: Dec. 27, 2002

(65) Prior Publication Data

US 2004/0124710 A1 Jul. 1, 2004

(51) Int. Cl.⁷ .............................. H02J 7/00; H02J 9/00
(52) U.S. Cl. ......................................................... 307/64
(58) Field of Search .............................. 307/64–66, 80, 307/29

(56) References Cited

U.S. PATENT DOCUMENTS

| 4,016,458 | A | | 4/1977 | Everhart | |
|---|---|---|---|---|---|
| 5,739,594 | A | * | 4/1998 | Sheppard et al. | 307/64 |
| 6,172,432 | B1 | * | 1/2001 | Schnackenberg et al. | 307/23 |
| 6,181,028 | B1 | | 1/2001 | Kern et al. | |
| 6,191,500 | B1 | * | 2/2001 | Toy | 307/64 |

FOREIGN PATENT DOCUMENTS

EP 0328706 8/1989

* cited by examiner

Primary Examiner—Gregory J. Toatley, Jr.
(74) Attorney, Agent, or Firm—Richard C. Litman

(57) ABSTRACT

An electrical power controller controls the selection of power sources, backup generator and normal utility line, to an automatically controlled load and other loads during and at the end of a power failure in a system. As long as the automatic load needs to be on, the power controller will connect the automatic load directly to a backup generator bypassing the transfer switch and disable a stop generator signal. When utility power returns, the transfer switch switches all other loads to operate from utility power and the transfer switch sends the stop signal to the backup generator. However, only when the power controller determines that the automatic load is no longer turned on will it re-enable the stop signal and return the automatic load to normal utility power selected by the transfer switch.

19 Claims, 3 Drawing Sheets

ELECTRICAL POWER CONTROLLER

BACKGROUND OF THE INVENTION

1. Field of the Invention

The present invention relates to an electrical power controller, which is added to a system having a backup generator and transfer switch, to control the backup power of an automatic load while backup power to other loads in the system are controlled by the transfer switch. The electrical power controller also controls the application of power to the automatic load during an exercising of the backup generator.

2. Description of the Related Art

In the related art, devices to control the turn on and off of the backup generator or other backup power source and provide the transfer of the connection of loads from the utility power to the backup power source when a power failure of the utility power occurs have been handled by one device with limited functions. Devices of this type are shown in U.S. Pat. No. 6,172,432 to Schnackenberg et al issued Jan. 9, 2001; U.S. Pat. No. 6,181,028 to Kern et al issued Jan. 30, 2001 and European Patent EP0328706 issued Aug. 8, 1989. Schnackenber et al discloses a load shedding feature for removing and restore different circuits. The other related art devices listed above do not provide other features.

In another related patent, U.S. Pat. No. 4,016,458 to Everhart issued Apr. 5, 1977, shows a device in which essential ones of the distribution amplifiers can be maintained operative by a DC standby power during AC line power hiatus and less important amplifiers are automatically rendered inoperative during power faults to prevent excessive drain on the standby source.

None of the prior art devices above provide control of power source supply to loads when the power utility failure ends.

It would be desirable to have a device to maintain the operation of an automatic load on the backup power source even after the return of normal utility power source and after the automatic load decides to stop, so as to prevent harmful surges or spikes that would occur if the automatic load is switched from a backup source to a utility power source during a required need for the automatic load to be turned on.

It would also be desirable to have a device that can at prescribed times exercise or test the operation of the backup power source only when the automatic load decides that it needs to run.

None of the above inventions and patents, taken either singularly or in combination, is seen to describe the instant invention as claimed. Thus an electrical power controller solving the aforementioned problems is desired.

SUMMARY OF THE INVENTION

The present invention is an electrical power controller to control the application of power to an automatically controlled load and other loads during and at the end of a power failure in a system.

The electrical power controller can be used in a plant such as a manufacturing plant or sewage treatment plant, which has a backup generator powered by some fossil fuel and a transfer switch as well as normal utility power The transfer switch normally controls the start up of a backup generator upon sensing a utility power failure and transfers the connection of all the loads from the utility power to the backup generator. When utility power returns, the transfer switch normally transfers the connection of all the loads from backup generator power to the utility power and controls the shutdown of the generator. The loads in the system may or may not be automatically controlled loads.

In a manufacturing plant or sewage treatment plant, an automatically controlled load is one like pumps that have sensors and relays to turn them on only when a water level in a well reaches a certain level and turns them off when the water level in the well that it has pumped reaches a lower level. Another example would be a furnace which is controlled to turn on and off by temperature. Such loads benefit from fewer surges and spikes on their power line input, if their sources of supply are not switched while running.

Thus, the instant invention adds a controller, such as programmable logic controller, having inputs and outputs; relays and lamp indicators to the above system.

The controller operates with inputs from the normal utility power source and the automatic load sensors in the automatically controlled load to prevent the connection transfer of automatic loads back to utility power even if the utility power failure has ended and as long as the automatic load sensors still require the automatic load to continue to operate. This is done by disabling the shut down of the backup generator and bypassing the transfer switch to provide the backup generator power directly to the automatic load power input. In the meantime the transfer switch, which has been prevented from shutting down the generator, will transfer other loads back to the utility power at the end of the utility power failure. Once the sensors stop calling for operation of the automatic load will the controller allow the automatic load to run on utility power by reconnecting the automatic load power input back to the transfer switch and release control of the generator back to the transfer switch for shutdown of the generator. At this point the automatic load sensors will have the automatic load turned off, and the automatic load is later ready to use the utility power.

The power controller also uses the same relays and monitors the same inputs to exercise or test the operation of the backup power source at prescribed times when there is no utility power failure and only when the automatic load decides that it needs to run.

Accordingly, it is a principal object of the invention to provide an electrical power controller that keeps an automatic load running on backup generator power even after utility power is restored by controlling the stop and start signal of the generator and controlling bypass relays.

It is another object of the invention to provide an electrical power controller that prevents an automatically controlled load from experiencing damaging power surges or spikes.

It is a further object of the invention to provide an electrical power controller that treats an automatically controlled load differently from other loads in system during and after a power failure of normal utility power.

Still another object of the invention is to provide an electrical power controller, that functions at prescribed times during normal operation of the utility power to exercise or test the operation of the backup power source only when the automatic load decides that it needs to run.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
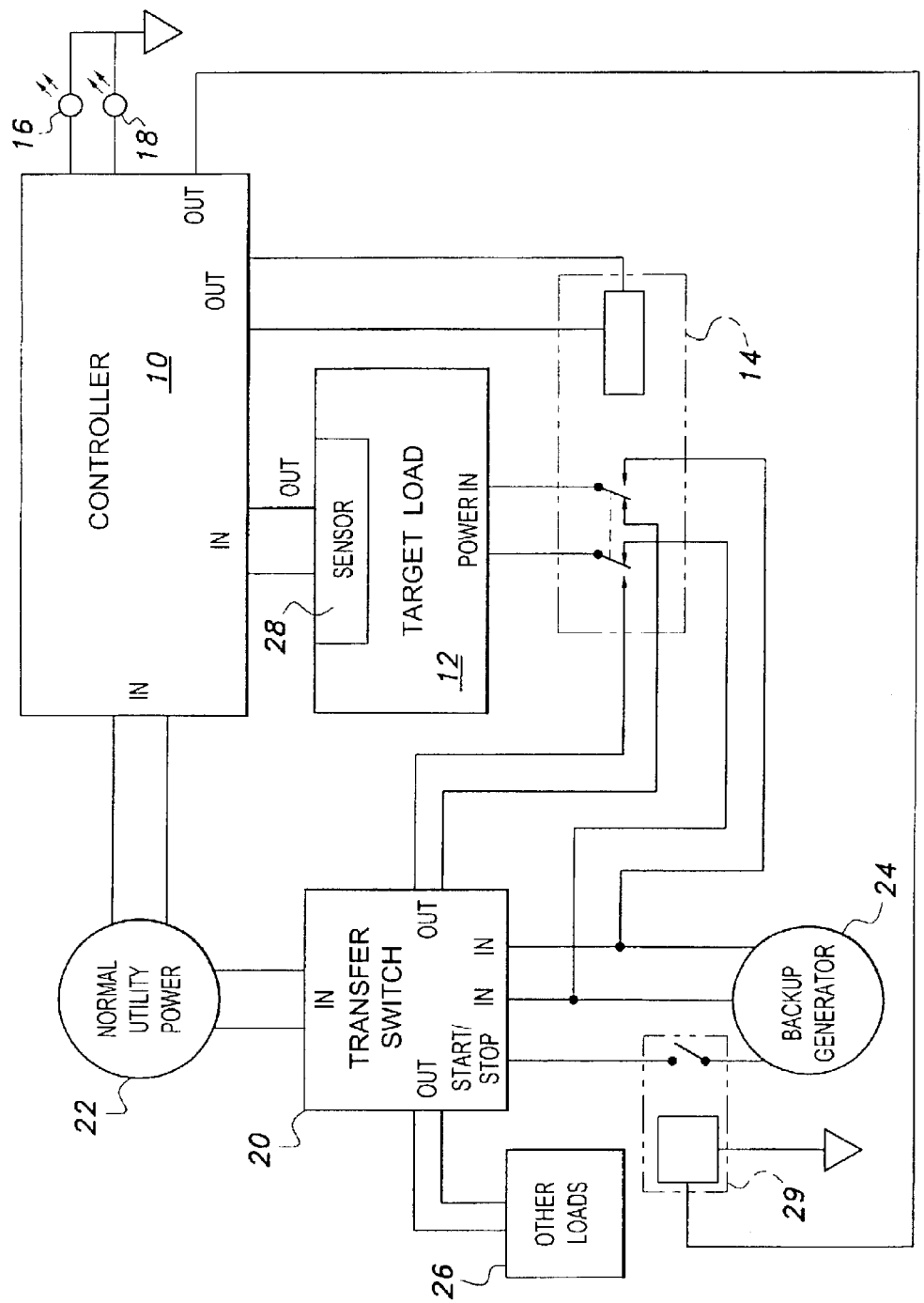
FIG. 1 is an electrical diagram of the electrical controller according to the present invention.

The present invention as shown in FIG. 1 includes a power controller 10, which is connected to an output from the normal utility power source 22. The power controller 10 senses and uses the output from the utility power source 22. Since the power controller 10 senses the loss of power from the normal utility power source 22 and is expected to function during the power failure, it should have its own source of backup power source provided by batteries connected internally to the power controller 10, which are recharged by the utility power source 22. Another input of the power controller 10 is connected to automatic load sensors 28, so that it can determine when the automatic load 12 is requested or required to turn on. The power controller 10 can be a programmable logic controller or microcomputer as is well known in the art.

The automatically controlled load 12 is one like pumps that have sensors 28 and relays to turn them on only when a water level in a well reaches a certain level and turns them off when the water level in the well that it has pumped reaches a lower level. Another example would be a furnace which is controlled to turn on and off by temperature. Such loads benefit from fewer surges and spikes on their power line input, if they are not switched while running.

A control output of the power controller 10 is connected to control a relay 14, so that it can bypass power output by the transfer switch 20 and receive power output by the backup generator 24 directly. Another control output of the power controller 10 is connected to a relay 29 to disable or enable the stop or start signal output from the transfer switch 20, which is input to a control input of the generator 24.

The transfer switch 20 is connected to the output of the normal utility power source 22 to sense its loss during a power failure and transfer its connection to and from the other loads 26 and automatic load 12. The transfer switch 20 is connected to the output of the backup generator source 24 for transferring its connection to and from the other loads 26 and automatic load 12.

The transfer switch 20 also uses the output of the backup generator 24 to see if it is up to speed and is providing the correct voltage after an initial startup. The transfer switch 20 has a stop and start signal output, which is also connected to a control input of the backup generator source 24 for controlling the stop and start of the generator 24.

The power controller 10 controls the relay 14. Under control of power controller 10, the relay 14 selects a power source connection of the automatic load 12 to either the output of the backup generator 24 directly or the output of the transfer switch 20. As shown relay 14 uses a double throw, double pole switch. The relay 14 may use a triple or quadruple pole switch in case the other loads 26 and automatic load 12 use 3 or 4 phase power sources, in which case the number of lines connecting the power sources and loads shown in FIG. 1 would also be more numerous.

The power controller 10 controls the relay 29. Under control of the power controller 10, the relay 29 enables or disables the stop signal output from the transfer switch 20, which is sent to the backup generator 24, by opening or closing of the connection. On the other side of the switch on the relay 29 closest to the backup generator 24, a pull-up or pull-down resistor maybe used to provide a proper voltage level of the stop signal when the switch is open.

Light indicators 16 and 18 are connected to outputs of the power controller 10 to indicate to the system the status of generator 24 exercise tests and automatic load 12 function.

Normally, the transfer switch 20 monitors the voltage output from the utility power 22 while it supplies the utility power 22 to other loads 26 and automatic load 12. Upon sensing a significant loss of voltage output from the utility power 22, the transfer switch 20 outputs a start signal to the generator 24 and waits for generator 24 to come up to speed with an acceptable voltage. Once the acceptable voltage is reached, the transfer switch 20 switches to supply power from the generator 24 to the loads 12 and 26.

Figure 2:
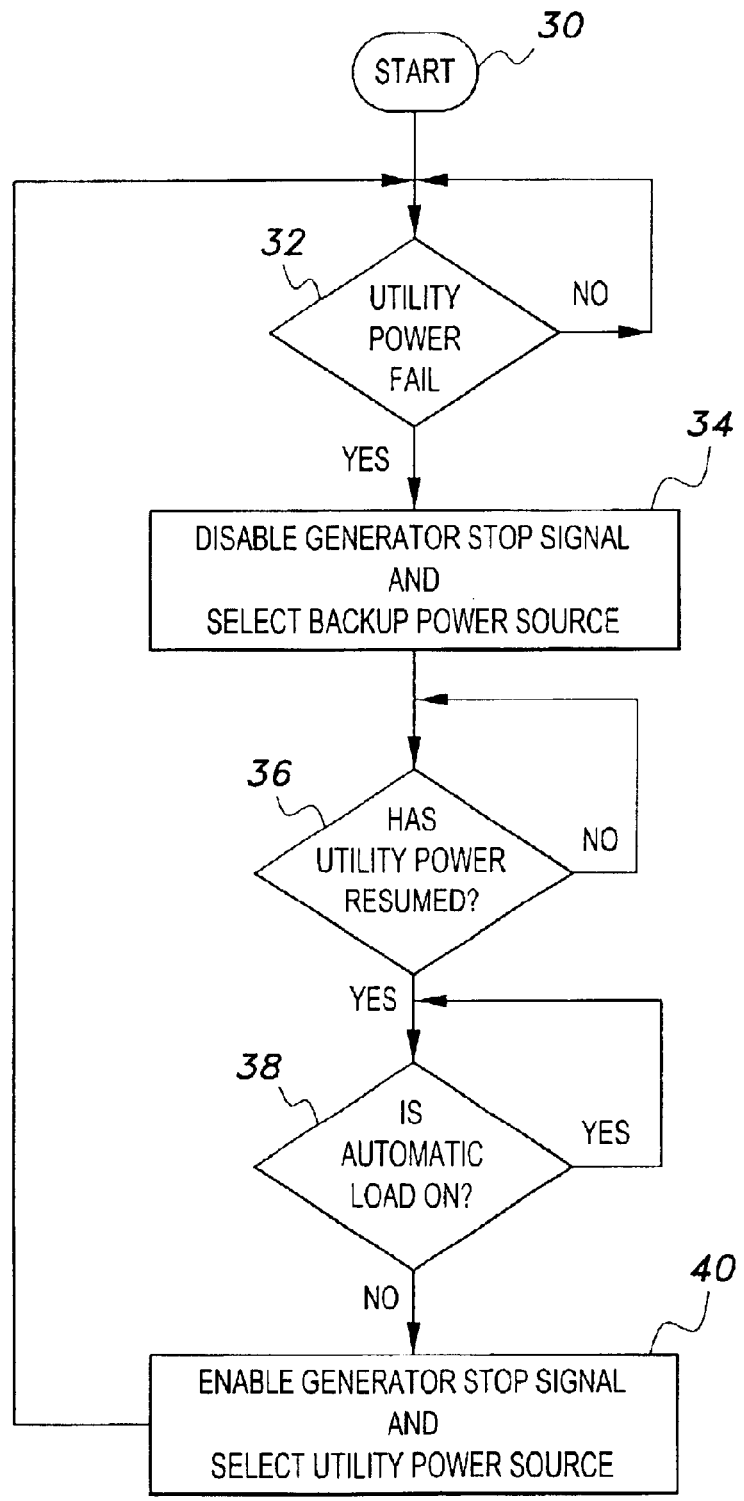
FIG. 2 is a flow diagram of a first operational feature of the present invention.

As shown in the flow diagram of FIG. 2, power controller 10 provides the function of sensing the utility power failure at step 32. If the power controller 10 senses a utility power failure, then at step 34 it activates the relay 14 so that the automatic load 12 receives power from the backup generator 24 after a short delay time to ensure that the generator 24 has had time to completely startup. Alternately, the power controller 10 may have an input connected to the backup generator 24 to sense when the generator 24 has come up to speed with an acceptable voltage as does the transfer switch 20.

At step 34, the power controller 10 also outputs a control signal to relay 29 to disable any stop signal output from the transfer switch 20. The automatic load 12 may be turned on or off at any time during the power failure as controlled by the sensors 28. The crucial time is when the power failure ends. So in step 36, the power controller 10 continuously checks to see if the utility power source 22 has resumed operation. Only if the utility power source 22 has resumed operation does the power controller 10 move to step 38.

At step 38, the power controller 10 checks sensor 28 to see if the automatic load 12 is running and turned on. If the automatic load 12 has been turned on then the controller 10 continues to check for the running automatic load 12 and continues the disabling of the stop signal output from the transfer switch 20 and continues the control of relay 14 to keep the power of automatic load 12 connected to the still running backup generator 24. When the automatic load 12 has been turned off the power controller 10 can move to step 40. At step 40, the power controller 10 will cut off the output to relay 14 causing the safe return of power to be provided to the automatic load 12 from the transfer switch 20, which is now providing power from the utility power source 22. Also at step 40, the power controller 10 will enable the stop signal output from the transfer switch 20, so that the generator 24 will be shutdown.

Therefore, harmful surges or spikes that would occur if the automatic load 12 was switched from one power source to another during a required need for the automatic load to be turned on is prevented.

Figure 3:
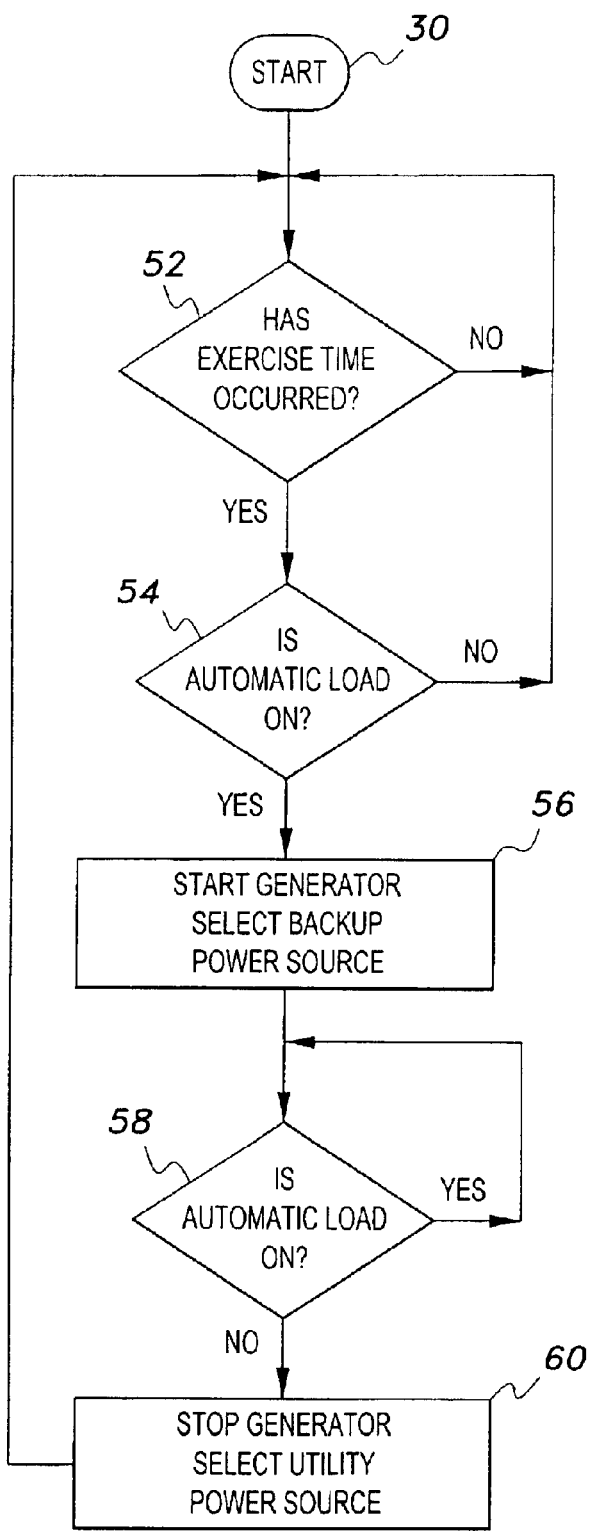
FIG. 3 is a flow diagram of a second operational feature of the present invention.

As shown in the flow diagram of FIG. 3, power controller 10 provides the further function of exercising or testing the operation of the backup power source 24 at prescribed times during normal operation of the utility power and only when the automatic load 12 decides that it needs to run.

At prescribed times provided by a clock or timer within the power controller 10 a exercising of the function of the backup generator 24 is called for. When an exercise time has occurred as in step 52, the automatic load 12 is checked to see if it has been turned on by sensors 28 in the automatic load 12 as shown in step 54. As shown in step 54, the power controller 10 continues to wait for the automatic load 12 to be turned on. If the automatic load 12 has been turned then it is ok to start the generator 24 via relay 29 and connect the automatic load 12 to the generator 24 via relay 14 as shown in step 56. Then in step 58, the power controller 10 checks the sensors 28 of the automatic load 12 to see if the sensors 28 are still on. If the automatic load 12 is still on due to sensors 28, then the controller 10 allows automatic load 12 to continue to be using the power from the running backup generator 24. If the automatic load 12 is no longer turned on due to sensors 28, then it is safe disable the backup generator 24 via relay 29 and return the connection of power for automatic load 12 to the utility power 20 via relay 14 as shown in step 60.

Therefore, harmful surges or spikes that would occur if the automatic load 12 was switched from one power source to another during a required need for the automatic load to be turned on is prevented.

It is to be understood that the present invention is not limited to the embodiments described above, but encompasses any and all embodiments within the scope of the following claims.

I claim:

1. An electrical power controller comprising:

A utility power source output and a backup power source output;

a transfer switch coupled to said utility power source output and said backup power source output;

a power controller coupled to said utility power source output;

an automatically controlled load having sensors coupled to said power controller inputs;

other power loads coupled to an output of said transfer switch;

a first relay coupled between said automatically controlled load and said transfer switch output and said backup power source output;

a second relay coupled between a control output of said transfer switch and a control input of said backup power source; and said first and second relays coupled to and controlled by said power controller;

wherein said transfer switch is configured to couple to said utility power source output to said other power loads and said automatically controlled load at said output of said transfer switch and is configured to output at said control output a stop signal to said backup power source when said utility power source is operating normal and is configured to couple said backup power source output to said other power loads and said automatically controlled load when said utility power source fails and is configured to output at said control output a start signal to said backup power source;

during said utility power failure said power controller couples said backup power source directly to said automatically controlled load through said first relay and disables a stop signal from said control output of said transfer switch through said second relay when said sensors of said automatically controlled load request said automatically controlled load to be turned on;

and after said utility power resumes said power controller recouples said automatically controlled load to said transfer switch through said first relay and enables a stop signal from said control output of said transfer switch through said second relay only when said sensors request said automatically controlled load be turned off.

2. An electrical power controller as claimed in claim 1, wherein said power controller is configured to exercise the operation of said backup power source when said utility power source is operating normally and said power controller detects a prescribed time to test said backup power source and said power controller will wait until said sensors of said automatic load turn on said automatic load to turn on said backup power source through said second relay and connect said automatic load to said backup power source through said first relay and only when said sensors of said automatic load turn off said automatic load will said controller cause said automatic load to be connected to said transfer switch through said first relay and turn off said backup power source through said second relay.

3. An electrical power controller as claimed in claim 1, wherein said backup power source is an electrical generator powered by another source of energy controlled by said start and stop signals.

4. An electrical power controller as claimed in claim 2, wherein said backup power source is an electrical generator powered by another source of energy controlled by said start and stop signals.

5. An electrical power controller as claimed in claim 1, wherein said backup power source is configured to operate only when needed by said utility power failure or a test.

6. An electrical power controller as claimed in claim 2, wherein said backup power source is configured to operate only when needed by said utility power failure or said test.

7. An electrical power controller as claimed in claim 3, wherein said backup power source is configured to operate only when needed by said utility power failure or said test.

8. An electrical power controller as claimed in claim 4, wherein said backup power source is configured to operate only when needed by said utility power failure or said test.

9. An electrical power controller as claimed in claim 1, wherein said power controller is programmable logic controller.

10. An electrical power controller as claimed in claim 2, wherein said power controller is programmable logic controller.

11. An electrical power controller as claimed in claim 3, wherein said power controller is programmable logic controller.

12. An electrical power controller comprising:

A utility power source output and a backup power source output;

a transfer switch coupled to said utility power source output and said backup power source output;

a power controller coupled to said utility power source output;

an automatically controlled load having sensors coupled to said power controller inputs;

other power loads coupled to an output of said transfer switch;

a first relay coupled between said automatically controlled load and said transfer switch output and said backup power source output;

a second relay coupled between a control output of said transfer switch and a control input of said backup power source;

said first and second relays coupled to and controlled by said power controller;

wherein said transfer switch is configured to couple to said utility power source output to said other power loads and said automatically controlled load at said output of said transfer switch and is configured to output at said control output a stop signal to said backup power source when said utility power source is operating normal and is configured to couple said backup power source output to said other power loads and said automatically controlled load when said utility power source fails and is configured to output at said control output a start signal to said backup power source;

and when said utility power source is operating normally and said power controller detects a prescribed time to test said backup power source and said power controller is configured to wait until said sensors of said automatic load turn on said automatic load to turn on said backup power source through said second relay and connect said automatic load to said backup power source through said first relay and only when said sensors of said automatic load turn off said automatic load will said controller cause said automatic load to be connected to said transfer switch through said first relay and turn off said backup power source through said second relay.

13. An electrical power controller as claimed in claim 12, wherein said backup power source is an electrical generator powered by another source of energy controlled by said start and stop signals.

14. An electrical power controller as claimed in claim 12, wherein said backup power source is configured to operate only when needed by said utility power failure or said test.

15. An electrical power controller as claimed in claim 13, wherein said backup power source is configured to operate only when needed by said utility power failure or said test.

16. An electrical power controller comprising:

A utility power source output and a backup power source output;

a transfer switch coupled to a utility power source output and a backup power source output;

a power controller coupled to said utility power source output;

an automatically controlled load having sensors coupled to said power controller inputs;

other power loads coupled to an output of said transfer switch;

a first relay coupled between said automatically controlled load and said transfer switch output and said backup power source output;

a second relay coupled between a control output of said transfer switch and a control input of said backup power source;

said first and second relays coupled to and controlled by said power controller;

wherein said transfer switch is configured to couple to said utility power source output to said other power loads and said automatically controlled load at said output of said transfer switch and is configured to output at said control output a stop signal to said backup power source when said utility power source is operating normal and is configured to couple said backup power source output to said other power loads and said automatically controlled load when said utility power source fails and is configured to output at said control output a start signal to said backup power source;

during said utility power failure said power controller couples said backup power source directly to said automatically controlled load through said first relay and disables a stop signal from said control output of said transfer switch through said second relay when said sensors of said automatically controlled load request said automatically controlled load to be turned on, and after said utility power resumes said power controller recouples said automatically controlled load to said transfer switch through said first relay and enables a stop signal from said control output of said transfer switch through said second relay only when said sensors request said automatically controlled load be turned off;

and when said utility power source is operating normally and said power controller detects a prescribed time to test said backup power source and said power controller will wait until said sensors of said automatic load turn on said automatic load to turn on said backup power source through said second relay and connect said automatic load to said backup power source through said first relay and only when said sensors of said automatic load turn off said automatic load will said controller cause said automatic load to be connected to said transfer switch through said first relay and turn off said backup power source through said second relay.

17. An electrical power controller as claimed in claim 16, wherein said backup power source is an electrical generator powered by another source of energy controlled by said start and stop signals.

18. An electrical power controller as claimed in claim 16, wherein said backup power source is configured to operate only when needed by said utility power failure or said test.

19. An electrical power controller as claimed in claim 17, wherein said backup power source is configured to operate only when needed by said utility power failure or said test.

* * * * *